(12) United States Patent
Lu et al.

(10) Patent No.: US 6,734,020 B2
(45) Date of Patent: May 11, 2004

(54) VALVE CONTROL SYSTEM FOR ATOMIC LAYER DEPOSITION CHAMBER

(75) Inventors: Siqing Lu, San Jose, CA (US); Yu Chang, San Jose, CA (US); Dongxi Sun, Cupertino, CA (US); Vinh Dang, San Jose, CA (US); Michael X. Yang, Palo Alto, CA (US); Anzhong Chang, San Jose, CA (US); Anh N. Nguyen, Milpitas, CA (US); Ming Xi, Milpitas, CA (US)

(73) Assignee: Applied Materials, Inc., Santa Clara, CA (US)

( * ) Notice: Subject to any disclaimer, the term of this patent is extended or adjusted under 35 U.S.C. 154(b) by 15 days.

(21) Appl. No.: 09/800,881

(22) Filed: Mar. 7, 2001

(65) Prior Publication Data

US 2002/0127745 A1 Sep. 12, 2002

(51) Int. Cl.⁷ ............................................. G01N 35/08
(52) U.S. Cl. ...................................................... 436/55
(58) Field of Search .............................. 137/3; 438/14; 436/55; 62/620; 118/314; 427/215

(56) References Cited

U.S. PATENT DOCUMENTS

| | | | |
|---|---|---|---|
| 4,058,430 A | 11/1977 | Suntola et al. | 156/611 |
| 4,263,091 A | 4/1981 | King | |
| 4,389,973 A | 6/1983 | Suntola et al. | 118/725 |
| 4,413,022 A | 11/1983 | Suntola et al. | 427/255.2 |
| 4,486,487 A | 12/1984 | Skarp | 428/216 |
| 4,542,044 A * | 9/1985 | Gano | 427/215 |
| 4,571,319 A | 2/1986 | Baluch et al. | |
| 4,767,494 A | 8/1988 | Kobayashi et al. | 156/606 |
| 4,806,321 A | 2/1989 | Nishizawa et al. | 422/245 |
| 4,813,846 A | 3/1989 | Helms | 414/744.1 |

(List continued on next page.)

FOREIGN PATENT DOCUMENTS

| | | | |
|---|---|---|---|
| DE | 196 27 017 | 1/1997 | H01L/21/283 |
| DE | 198 20 147 | 7/1999 | H01L/21/3205 |
| EP | 0 344 352 A1 | 12/1989 | H01L/39/24 |
| EP | 0 429 270 A2 | 5/1991 | G03F/7/36 |
| EP | 0 442 490 A1 | 8/1991 | C30B/25/02 |

(List continued on next page.)

OTHER PUBLICATIONS

Hultman, et al., "Review of the thermal and mechanical stability of TiN–based thin films", *Zeitschrift Fur Metallkunde*, 90(10) (Oct. 1999), pp. 803–813.

(List continued on next page.)

*Primary Examiner*—John F. Niebling
*Assistant Examiner*—André C Stevenson
(74) *Attorney, Agent, or Firm*—Dugan & Dugan LLP.

(57) ABSTRACT

A valve control system for a semiconductor processing chamber includes a system control computer and a plurality of electrically controlled valves associated with the processing chamber. The system further includes a programmable logic controller in communication with the system control computer and operatively coupled to the electrically controlled valves. The refresh time for control of the valves may be less than 10 milliseconds. Consequently, valve control operations do not significantly extend the period of time required for highly repetitive cycling in atomic layer deposition processes. A hardware interlock may be implemented through the output power supply of the programmable logic controller.

11 Claims, 3 Drawing Sheets

U.S. PATENT DOCUMENTS

| | | | |
|---|---|---|---|
| 4,829,022 A | 5/1989 | Kobayashi et al. | 437/107 |
| 4,834,831 A | 5/1989 | Nishizawa et al. | 156/611 |
| 4,835,701 A | 5/1989 | Ohiwa et al. | |
| 4,838,983 A | 6/1989 | Schumaker et al. | 156/613 |
| 4,838,993 A | 6/1989 | Aoki et al. | 156/643 |
| 4,840,921 A | 6/1989 | Matsumoto | 437/89 |
| 4,845,049 A | 7/1989 | Sunakawa | 437/81 |
| 4,859,625 A | 8/1989 | Nishizawa et al. | 437/81 |
| 4,859,627 A | 8/1989 | Sunakawa | 437/81 |
| 4,861,417 A | 8/1989 | Mochizuki et al. | 156/610 |
| 4,876,218 A | 10/1989 | Pessa et al. | 437/107 |
| 4,917,556 A | 4/1990 | Stark et al. | 414/217 |
| 4,927,670 A | 5/1990 | Erbil | 427/255.3 |
| 4,931,132 A | 6/1990 | Aspnes et al. | 156/601 |
| 4,951,601 A | 8/1990 | Maydan et al. | 118/719 |
| 4,960,720 A | 10/1990 | Shimbo | 437/105 |
| 4,975,252 A | 12/1990 | Nishizawa et al. | 422/245 |
| 4,993,357 A | 2/1991 | Scholz | 118/715 |
| 5,000,113 A | 3/1991 | Wang et al. | 118/723 |
| 5,013,683 A | 5/1991 | Petroff et al. | 437/110 |
| 5,028,565 A | 7/1991 | Chang et al. | 437/192 |
| 5,071,320 A | 12/1991 | Anderson, Jr. | |
| 5,082,798 A | 1/1992 | Arimoto | 437/108 |
| 5,085,885 A | 2/1992 | Foley et al. | 477/38 |
| 5,091,320 A | 2/1992 | Aspnes et al. | 437/8 |
| 5,130,269 A | 7/1992 | Kitahara et al. | 437/111 |
| 5,166,092 A | 11/1992 | Mochizuki et al. | 437/105 |
| 5,173,474 A | 12/1992 | Connell et al. | 505/1 |
| 5,186,718 A | 2/1993 | Tepman et al. | 29/25.01 |
| 5,205,077 A | 4/1993 | Wittstock | 51/165 R |
| 5,225,366 A | 7/1993 | Yoder | 437/108 |
| 5,234,561 A | 8/1993 | Randhawa et al. | 204/192.38 |
| 5,246,536 A | 9/1993 | Nishizawa et al. | 156/610 |
| 5,250,148 A | 10/1993 | Nishizawa et al. | 156/611 |
| 5,254,207 A | 10/1993 | Nishizawa et al. | 156/601 |
| 5,256,244 A | 10/1993 | Ackerman | 156/613 |
| 5,259,881 A | 11/1993 | Edwards et al. | 118/719 |
| 5,270,247 A | 12/1993 | Sakuma et al. | 437/133 |
| 5,278,435 A | 1/1994 | Van Hove et al. | 257/184 |
| 5,281,274 A | 1/1994 | Yoder | 118/697 |
| 5,286,296 A | 2/1994 | Sato et al. | 118/719 |
| 5,290,748 A | 3/1994 | Knuuttila et al. | 502/228 |
| 5,294,286 A | 3/1994 | Nishizawa et al. | 156/610 |
| 5,296,403 A | 3/1994 | Nishizawa et al. | 437/133 |
| 5,300,186 A | 4/1994 | Kitahara et al. | 156/613 |
| 5,311,055 A | 5/1994 | Goodman et al. | 257/593 |
| 5,316,615 A | 5/1994 | Copel | 117/95 |
| 5,316,793 A | 5/1994 | Wallace et al. | 427/248.1 |
| 5,330,610 A | 7/1994 | Eres et al. | 117/92 |
| 5,336,324 A | 8/1994 | Stall et al. | 118/719 |
| 5,338,389 A | 8/1994 | Nishizawa et al. | 117/89 |
| 5,348,911 A | 9/1994 | Jurgensen et al. | 117/91 |
| 5,374,570 A | 12/1994 | Nasu et al. | 437/40 |
| 5,395,791 A | 3/1995 | Cheng et al. | 437/105 |
| 5,438,952 A | 8/1995 | Otsuka | 117/84 |
| 5,439,876 A | 8/1995 | Graf et al. | 505/447 |
| 5,441,703 A | 8/1995 | Jurgensen | 422/129 |
| 5,443,033 A | 8/1995 | Nishizawa et al. | 117/86 |
| 5,443,647 A | 8/1995 | Aucoin et al. | 118/723 ME |
| 5,455,072 A | 10/1995 | Bension et al. | 427/255.7 |
| 5,458,084 A | 10/1995 | Thorne et al. | 117/89 |
| 5,469,806 A | 11/1995 | Mochizuki et al. | 117/97 |
| 5,480,818 A | 1/1996 | Matsumoto et al. | 437/40 |
| 5,483,919 A | 1/1996 | Yokoyama et al. | 117/89 |
| 5,484,664 A | 1/1996 | Kitahara et al. | 428/641 |
| 5,503,875 A | 4/1996 | Imai et al. | 427/255.3 |
| 5,521,126 A | 5/1996 | Okamura et al. | 437/235 |
| 5,527,733 A | 6/1996 | Nishizawa et al. | 437/160 |
| 5,532,511 A | 7/1996 | Nishizawa et al. | 257/627 |
| 5,540,783 A | 7/1996 | Eres et al. | 118/725 |
| 5,580,380 A | 12/1996 | Liu et al. | 117/86 |
| 5,601,651 A | 2/1997 | Watabe | 118/715 |
| 5,609,689 A | 3/1997 | Kato et al. | 118/719 |
| 5,616,181 A | 4/1997 | Yamamoto et al. | 118/723 ER |
| 5,637,530 A | 6/1997 | Gaines et al. | 114/105 |
| 5,641,984 A | 6/1997 | Aftergut et al. | 257/433 |
| 5,644,128 A | 7/1997 | Wollnik et al. | 250/251 |
| 5,667,592 A | 9/1997 | Boitnott et al. | 118/719 |
| 5,674,786 A | 10/1997 | Turner et al. | 437/225 |
| 5,693,139 A | 12/1997 | Nishizawa et al. | 117/89 |
| 5,695,564 A | 12/1997 | Imahashi | 118/719 |
| 5,705,224 A | 1/1998 | Murota et al. | 427/248.1 |
| 5,707,880 A | 1/1998 | Aftergut et al. | 437/3 |
| 5,711,811 A | 1/1998 | Suntola et al. | 118/711 |
| 5,730,801 A | 3/1998 | Tepman et al. | 118/719 |
| 5,730,802 A | 3/1998 | Ishizumi et al. | 118/719 |
| 5,747,113 A | 5/1998 | Tsai | 427/255.5 |
| 5,749,974 A | 5/1998 | Habuka et al. | 118/725 |
| 5,788,447 A | 8/1998 | Yonemitsu et al. | 414/217 |
| 5,788,799 A | 8/1998 | Steger et al. | 156/345 |
| 5,796,116 A | 8/1998 | Nakata et al. | 257/66 |
| 5,801,634 A | 9/1998 | Young et al. | 340/635 |
| 5,807,792 A | 9/1998 | Ilg et al. | 438/758 |
| 5,830,270 A | 11/1998 | McKee et al. | 117/106 |
| 5,835,677 A | 11/1998 | Li et al. | 392/401 |
| 5,851,849 A | 12/1998 | Comizzoli et al. | 438/38 |
| 5,855,675 A | 1/1999 | Doering et al. | 118/719 |
| 5,855,680 A | 1/1999 | Soininen et al. | 118/719 |
| 5,856,219 A | 1/1999 | Naito et al. | 438/241 |
| 5,858,102 A | 1/1999 | Tsai | 118/719 |
| 5,866,213 A | 2/1999 | Foster et al. | 427/573 |
| 5,866,795 A | 2/1999 | Wang et al. | 73/1.36 |
| 5,879,459 A | 3/1999 | Gadgil et al. | 118/715 |
| 5,882,165 A | 3/1999 | Maydan et al. | 414/217 |
| 5,882,413 A | 3/1999 | Beaulieu et al. | 118/719 |
| 5,904,565 A | 5/1999 | Nguyen et al. | 438/687 |
| 5,916,365 A | 6/1999 | Sherman | 117/92 |
| 5,923,056 A | 7/1999 | Lee et al. | 257/192 |
| 5,923,985 A | 7/1999 | Aoki et al. | 438/301 |
| 5,925,574 A | 7/1999 | Aoki et al. | 437/31 |
| 5,928,389 A | 7/1999 | Jevtic | 29/25.01 |
| 5,942,040 A | 8/1999 | Kim et al. | 118/726 |
| 5,947,710 A | 9/1999 | Cooper et al. | 418/63 |
| 5,972,430 A | 10/1999 | DiMeo, Jr. et al. | 427/255.32 |
| 6,001,669 A | 12/1999 | Gaines et al. | 438/102 |
| 6,015,590 A | 1/2000 | Suntola et al. | 427/255.23 |
| 6,025,627 A | 2/2000 | Forbes et al. | 257/321 |
| 6,036,773 A | 3/2000 | Wang et al. | 117/97 |
| 6,042,652 A | 3/2000 | Hyun et al. | 118/719 |
| 6,043,177 A | 3/2000 | Falconer et al. | 502/4 |
| 6,050,283 A * | 4/2000 | Hoffman | 137/3 |
| 6,051,286 A | 4/2000 | Zhao et al. | 427/576 |
| 6,062,798 A | 5/2000 | Muka | 414/416 |
| 6,071,808 A | 6/2000 | Merchant et al. | 438/633 |
| 6,084,302 A | 7/2000 | Sandhu | 257/751 |
| 6,086,677 A | 7/2000 | Umotoy et al. | 118/715 |
| 6,110,556 A | 8/2000 | Bang et al. | 428/64.1 |
| 6,113,977 A | 9/2000 | Soininen et al. | 427/64 |
| 6,117,244 A | 9/2000 | Bang et al. | 118/715 |
| 6,124,158 A | 9/2000 | Dautartas et al. | 438/216 |
| 6,130,147 A | 10/2000 | Major et al. | 438/604 |
| 6,139,700 A | 10/2000 | Kang et al. | 204/192.17 |
| 6,140,237 A | 10/2000 | Chan et al. | 438/687 |
| 6,140,238 A | 10/2000 | Kitch | 438/687 |
| 6,142,162 A | 11/2000 | Arnold | |
| 6,143,659 A | 11/2000 | Leem | 438/688 |
| 6,144,060 A | 11/2000 | Park et al. | 257/310 |
| 6,158,446 A | 12/2000 | Mohindra et al. | 134/25.4 |
| 6,174,377 B1 | 1/2001 | Doering et al. | 118/729 |
| 6,174,809 B1 | 1/2001 | Kang et al. | 438/682 |
| 6,200,893 B1 | 3/2001 | Sneh | 438/685 |

| | | | | |
|---|---|---|---|---|
| 6,203,613 B1 | 3/2001 | Gates et al. ............... 117/104 | JP | 02-063115 | 3/1990 | ........... H01L/21/20 |
| 6,206,967 B1 | 3/2001 | Mak et al. ................. 118/666 | JP | 02-074029 | 3/1990 | ......... H01L/21/205 |
| 6,207,302 B1 | 3/2001 | Sugiura et al. ............ 428/690 | JP | 02-074587 | 3/1990 | ........... C30B/23/08 |
| 6,248,605 B1 | 6/2001 | Harkonen et al. ........... 438/29 | JP | 02-106822 | 4/1990 | ........... H01B/13/00 |
| 6,270,572 B1 | 8/2001 | Kim et al. .................. 117/93 | JP | 02-129913 | 5/1990 | ......... H01L/21/205 |
| 6,271,148 B1 | 8/2001 | Kao et al. .................. 438/727 | JP | 02-162717 | 6/1990 | ........... H01L/21/20 |
| 6,287,965 B1 | 9/2001 | Kang et al. ................ 438/648 | JP | 02-172895 | 7/1990 | ........... C30B/29/36 |
| 6,291,876 B1 | 9/2001 | Stumborg et al. ........... 257/632 | JP | 02-196092 | 8/1990 | ........... C30B/25/14 |
| 6,305,314 B1 | 10/2001 | Sneh et al. ............. 118/723 R | JP | 02-203517 | 8/1990 | ......... H01L/21/205 |
| 6,306,216 B1 | 10/2001 | Kim et al. .................. 118/725 | JP | 02-230690 | 9/1990 | ........... H05B/33/10 |
| 6,316,098 B1 | 11/2001 | Yitzchaik et al. ........... 428/339 | JP | 02-230722 | 9/1990 | ......... H01L/21/205 |
| 2001/0000866 A1 | 5/2001 | Sneh et al. ............. 118/723 R | JP | 02-246161 | 10/1990 | ......... H01L/29/784 |
| 2001/0009140 A1 | 7/2001 | Bondestam et al. ........ 118/725 | JP | 02-264491 | 10/1990 | ............. H01S/3/18 |
| 2001/0011526 A1 | 8/2001 | Doering et al. ............. 118/729 | JP | 02-283084 | 11/1990 | ............. H01S/3/18 |
| 2001/0031562 A1 | 10/2001 | Raaijmakers et al. ....... 438/770 | JP | 02-304916 | 12/1990 | ......... H01L/21/205 |
| 2001/0034123 A1 | 10/2001 | Jeon et al. ................. 438/643 | JP | 03-019211 | 1/1991 | ......... H01L/21/205 |
| 2001/0041250 A1 | 11/2001 | Werkhoven et al. ........ 428/212 | JP | 03-022569 | 1/1991 | ......... H01L/29/804 |

FOREIGN PATENT DOCUMENTS

| | | | | |
|---|---|---|---|---|
| EP | 0 799 641 A2 | 10/1997 | ............ B01J/20/32 | JP | 03-044967 | 2/1991 | ......... H01L/29/48 |
| FR | 2 626 110 | 7/1989 | ........... H01L/39/24 | JP | 03-048421 | 3/1991 | ......... H01L/21/302 |
| FR | 2 692 597 | 12/1993 | ........... C23C/16/00 | JP | 03-070124 | 3/1991 | ......... H01L/21/205 |
| GB | 2 355 727 A | 5/2001 | ........... C23C/16/44 | JP | 03-185716 | 8/1991 | ......... H01L/21/205 |
| JP | 58-098917 | 6/1983 | ......... H01L/21/205 | JP | 03-208885 | 9/1991 | ........... C30B/23/02 |
| JP | 58-100419 | 6/1983 | ........... H01L/21/20 | JP | 03-234025 | 10/1991 | ......... H01L/21/318 |
| JP | 60-065712 A | 4/1985 | ......... C01B/33/113 | JP | 03-286522 | 12/1991 | ......... H01L/21/205 |
| JP | 61-035847 | 2/1986 | ........... B01J/19/08 | JP | 03-286531 | 12/1991 | ......... H01L/21/316 |
| JP | 61-210623 | 9/1986 | ......... H01L/21/205 | JP | 04-031391 | 2/1992 | ......... C30B/23/08 |
| JP | 62-069508 | 3/1987 | ......... H01L/21/203 | JP | 04-031396 A | 2/1992 | ........... C30B/25/14 |
| JP | 62-091495 A | 4/1987 | ........... C30B/25/02 | JP | 04-031396 | 2/1992 | ........... C30B/25/14 |
| JP | 62-141717 | 6/1987 | ......... H01L/21/203 | JP | 04-100292 | 4/1992 | ............ H01S/3/18 |
| JP | 62-167297 | 7/1987 | ........... C30B/29/40 | JP | 04-111418 | 4/1992 | ......... H01L/21/205 |
| JP | 62-171999 | 7/1987 | ........... C30B/29/40 | JP | 04-132214 | 5/1992 | ......... H01L/21/205 |
| JP | 62-232919 | 10/1987 | ......... H01L/21/205 | JP | 04-132681 | 5/1992 | ........... C30B/25/14 |
| JP | 63-062313 | 3/1988 | ......... H01L/21/203 | JP | 04/151822 | 5/1992 | ......... H01L/21/205 |
| JP | 63-085098 | 4/1988 | ........... C30B/21/40 | JP | 04-162418 | 6/1992 | ......... H01L/21/205 |
| JP | 63-090833 | 4/1988 | ......... H01L/21/365 | JP | 04-175299 | 6/1992 | ........... C30B/29/68 |
| JP | 63-222420 | 9/1988 | ......... H01L/21/205 | JP | 04-186824 | 7/1992 | ......... H01L/21/205 |
| JP | 63-222421 | 9/1988 | ......... H01L/21/205 | JP | 04-212411 | 8/1992 | ......... H01L/21/203 |
| JP | 63-227007 | 9/1988 | ......... H01L/21/205 | JP | 04-260696 | 9/1992 | ........... C30B/29/40 |
| JP | 63-252420 | 10/1988 | ......... H01L/21/205 | JP | 04-273120 | 9/1992 | ........... H01L/21/20 |
| JP | 63-266814 | 11/1988 | ......... H01L/21/205 | JP | 04-285167 | 10/1992 | ........... C23C/14/54 |
| JP | 64-009895 | 1/1989 | ........... C30B/29/40 | JP | 04-291916 | 10/1992 | ......... H01L/21/205 |
| JP | 64-009896 | 1/1989 | ........... C30B/29/40 | JP | 04-325500 | 11/1992 | ........... C30B/33/00 |
| JP | 64-009897 | 1/1989 | ........... C30B/29/40 | JP | 04-328874 | 11/1992 | ......... H01L/29/804 |
| JP | 64-037832 | 2/1989 | ......... H01L/21/205 | JP | 05-029228 | 2/1993 | ......... H01L/21/205 |
| JP | 64-082615 | 3/1989 | ......... H01L/21/205 | JP | 05-047665 | 2/1993 | ......... H01L/21/205 |
| JP | 64-082617 | 3/1989 | ......... H01L/21/205 | JP | 05-047666 | 2/1993 | ......... H01L/21/205 |
| JP | 64-082671 | 3/1989 | ........... H01L/29/78 | JP | 05-047668 | 2/1993 | ......... H01L/21/205 |
| JP | 64-082676 | 3/1989 | ........... H01L/29/80 | JP | 05-074717 | 3/1993 | ......... H01L/21/205 |
| JP | 01-103982 | 4/1989 | ........... C30B/23/08 | JP | 05-074724 | 3/1993 | ......... H01L/21/205 |
| JP | 01-103996 | 4/1989 | ........... C30B/29/40 | JP | 05-102189 | 4/1993 | ......... H01L/21/336 |
| JP | 64-090524 | 4/1989 | ......... H01L/21/205 | JP | 05-160152 | 6/1993 | ......... H01L/21/336 |
| JP | 01-117017 | 5/1989 | ......... H01L/21/203 | JP | 05-175143 | 7/1993 | ......... H01L/21/205 |
| JP | 01-143221 | 6/1989 | ......... H01L/21/314 | JP | 05-175145 | 7/1993 | ......... H01L/21/205 |
| JP | 01-143233 | 6/1989 | ........... H01L/21/76 | JP | 05-182906 | 7/1993 | ........... H01L/21/20 |
| JP | 01-154511 | 6/1989 | ........... H01L/21/20 | JP | 05-186295 | 7/1993 | ........... C30B/25/02 |
| JP | 01-236657 | 9/1989 | ........... H01L/29/80 | JP | 05-206036 | 8/1993 | ......... H01L/21/205 |
| JP | 01-245512 | 9/1989 | ......... H01L/21/205 | JP | 05-234899 | 9/1993 | ......... H01L/21/205 |
| JP | 01-264218 | 10/1989 | ......... H01L/21/205 | JP | 05-235047 | 9/1993 | ......... H01L/21/338 |
| JP | 01-270593 | 10/1989 | ........... C30B/25/02 | JP | 05-251339 | 9/1993 | ........... H01L/21/20 |
| JP | 01-272108 | 10/1989 | ......... H01L/21/203 | JP | 05-270997 | 10/1993 | ........... C30B/29/68 |
| JP | 01-290221 | 11/1989 | ......... H01L/21/205 | JP | 05-283336 | 10/1993 | ........... H01L/21/20 |
| JP | 01-290222 | 11/1989 | ......... H01L/21/205 | JP | 05-291152 | 11/1993 | ......... H01L/21/205 |
| JP | 01-296673 | 11/1989 | ........... H01L/29/88 | JP | 05-304334 | 11/1993 | ............ H01L/3/18 |
| JP | 01-303770 | 12/1989 | ........... H01L/39/24 | JP | 05-343327 | 12/1993 | ......... H01L/21/205 |
| JP | 01-305894 | 12/1989 | ........... C30B/23/08 | JP | 05-343685 | 12/1993 | ......... H01L/29/784 |
| JP | 01-313927 | 12/1989 | ......... H01L/21/205 | JP | 06-045606 | 2/1994 | ......... H01L/29/784 |
| JP | 02-012814 | 1/1990 | ......... H01L/21/205 | JP | 06-132236 | 5/1994 | ......... H01L/21/205 |
| JP | 02-014513 | 1/1990 | ......... H01L/21/205 | JP | 06-177381 | 6/1994 | ......... H01L/29/784 |
| JP | 02-017634 | 1/1990 | ......... H01L/21/225 | JP | 06-196809 | 7/1994 | ............ H01S/3/18 |

| | | | |
|---|---|---|---|
| JP | 06-222388 | 8/1994 | G02F/1/136 |
| JP | 06-224138 | 8/1994 | H01L/21/205 |
| JP | 06-230421 | 8/1994 | G02F/1/136 |
| JP | 06-252057 | 9/1994 | H01L/21/205 |
| JP | 06-291048 | 10/1994 | H01L/21/205 |
| JP | 07-070752 | 3/1995 | C23C/16/40 |
| JP | 07-086269 | 3/1995 | H01L/21/314 |
| JP | 08-181076 | 7/1996 | H01L/21/205 |
| JP | 08-245291 | 9/1996 | C30B/25/14 |
| JP | 08-264530 | 10/1996 | H01L/21/3205 |
| JP | 09-260786 | 10/1997 | H01S/3/18 |
| JP | 09-293681 | 11/1997 | H01L/21/205 |
| JP | 10-188840 | 7/1998 | H01J/29/18 |
| JP | 10-190128 | 7/1998 | H01S/3/18 |
| JP | 10-308283 | 11/1998 | H05B/33/22 |
| JP | 11-269652 | 10/1999 | C23C/16/44 |
| JP | 2000-031387 | 1/2000 | H01L/27/04 |
| JP | 2000-058777 | 2/2000 | H01L/27/108 |
| JP | 2000-068072 | 3/2000 | H05B/33/22 |
| JP | 2000-087029 | 3/2000 | C09K/11/08 |
| JP | 2000-319772 | 3/2000 | C23C/16/00 |
| JP | 2000-138094 | 5/2000 | H05B/33/10 |
| JP | 2000-218445 | 8/2000 | B23P/6/00 |
| JP | 2000-319772 | 11/2000 | C23C/14/24 |
| JP | 2000-340883 | 12/2000 | H01S/5/125 |
| JP | 2000-353666 | 12/2000 | H01L/21/205 |
| JP | 2001-020075 | 1/2001 | C23C/16/44 |
| JP | 2001-62244 | 3/2001 | B01D/53/34 |
| JP | 2001-152339 | 6/2001 | C23C/16/40 |
| JP | 2001-172767 | 6/2001 | C23C/16/40 |
| JP | 2001-189312 | 7/2001 | H01L/21/316 |
| JP | 2001-217206 | 8/2001 | H01L/21/285 |
| JP | 2001-220287 | 8/2001 | C30B/25/02 |
| JP | 2001-220294 | 8/2001 | C30B/29/20 |
| JP | 2001-240972 | 9/2001 | C23C/16/458 |
| JP | 2001-254181 | 9/2001 | C23C/16/46 |
| JP | 2001-284042 | 10/2001 | H05B/33/04 |
| JP | 2001-303251 | 10/2001 | C23C/16/44 |
| JP | 2001-328900 | 11/2001 | C30B/29/68 |
| WO | 90/02216 | 3/1990 | C23C/14/34 |
| WO | 91/10510 A1 | 7/1991 | B01J/37/02 |
| WO | 93/02111 A1 | 2/1993 | C08F/4/78 |
| WO | 96/17107 A1 | 6/1996 | C23C/16/44 |
| WO | 96/18756 A1 | 6/1996 | C23C/16/08 |
| WO | 98/06889 | 2/1998 | |
| WO | 98/51838 | 11/1998 | C23C/16/06 |
| WO | 99/01595 | 1/1999 | C30B/25/14 |
| WO | 99/13504 | 3/1999 | H01L/21/68 |
| WO | 99/29924 A1 | 6/1999 | C23C/16/04 |
| WO | 99/41423 A2 | 8/1999 | |
| WO | 00/11721 | 3/2000 | H01L/29/43 |
| WO | 00/15865 A1 | 3/2000 | C23C/16/00 |
| WO | 00/15881 A2 | 3/2000 | |
| WO | 00/16377 A2 | 3/2000 | |
| WO | 00/54320 A1 | 9/2000 | H01L/21/44 |
| WO | 00/63957 A1 | 10/2000 | H01L/21/205 |
| WO | 00/79019 A1 | 12/2000 | C23C/16/00 |
| WO | 00/79576 A1 | 12/2000 | H01L/21/205 |
| WO | 01/15220 | 3/2001 | H01L/21/768 |
| WO | 01/15220 A1 | 3/2001 | H01L/21/768 |
| WO | 01/27346 A1 | 4/2001 | C23C/16/44 |
| WO | 01/27347 A1 | 4/2001 | C23C/16/44 |
| WO | 01/29280 A1 | 4/2001 | C23C/16/32 |
| WO | 01/29891 A1 | 4/2001 | H01L/21/768 |
| WO | 01/29893 A1 | 4/2001 | H01L/21/768 |
| WO | 01/36702 A1 | 5/2001 | C23C/16/00 |
| WO | 01/40541 A1 | 6/2001 | C23C/16/40 |
| WO | 01/66832 A2 | 9/2001 | C30B/16/44 |

OTHER PUBLICATIONS

Klaus, et al., "Atomic Layer Deposition of SiO$_2$ Using Catalyzed and Uncatalyzed Self–Limiting Surface Reactions", *Surface Review & Letters*, 6(3&4) (1999), pp. 435–448.

Yamaguchi, et al., "Atomic–layer chemical–vapor–deposition of silicon dioxide films with extremely low hydrogen content", *Appl. Surf. Sci.*, vol. 130–132 (1998), pp. 202–207.

George, et al., "Surface Chemistry for Atomic Layer Growth", *J. Phys. Chem.*, vol. 100 (1996), pp. 13121–13131.

George, et al., "Atomic layer controlled deposition of SiO$_2$ and Al$_2$O$_3$ using ABAB . . . binary reaction sequence chemistry", *Appl. Surf. Sci.*, vol. 82/83 (1994), pp. 460–467.

Wise, et al., "Diethyldiethoxysilane as a new precursor for SiO$_2$ growth on silicon", *Mat. Res. Soc. Symp. Proc.*, vol. 334 (1994), pp. 37–43.

Niinisto, et al., "Synthesis of oxide thin films and overlayers by atomic layer epitaxy for advanced applications", *Mat. Sci. & Eng.*, vol. B41 (1996), pp. 23–29.

Ritala, et al., "Perfectly conformal TiN and Al$_2$O$_3$ films deposited by atomic layer deposition", *Chemical Vapor Deposition*, vol. 5(1) (Jan. 1999), pp. 7–9.

Klaus, et al., "Atomically controlled growth of tungsten and tungsten nitride using sequential surface reactions". *Appl. Surf. Sci.*, vol. 162–163 (2000), pp. 479–491.

Min, et al., "Atomic layer deposition of TiN thin films by sequential introduction of Ti precursor and NH/sub3/", *Symp.: Advanced Interconnects and Contact Materials and Processes for Future Integrated Circuits* (Apr. 13–16, 1998), pp. 337–342.

Klaus, et al., Atomic Layer Deposition of Tungsten using Sequential Surface Chemistry with a Sacrificial Stripping Reaction, Thin Solid Films 360 (2000), pp. 145–153, (Accepted Nov. 16, 1999).

Min, et al., "Metal–Organic Atomic–Layer Deposition of Titanium–Silicon–Nitride Films", *Applied Physics Letters*, American Inst. Of Physics, vol 75(11) (Sep. 13, 1999).

Martensson, et al., "Atomic Layer Epitaxy of Copper on Tantalum", *Chemical Vapor Deposition*, 3(1) (Feb. 1, 1997), pp. 45–50.

Ritala, et al. "Atomic Layer Epitaxy Growth of TiN Thin Films", *J. Electrochem. Soc.*, 142(8) (Aug. 1995), pp. 2731–2737.

Elers, et al., "NbCl5 as a precursor in atomic layer epitaxy", *Appl. Surf. Sci.*, vol. 82/83 (1994), pp. 468–474.

Lee, "The Preparation of Titanium–Based Thin Film by CVD Using Titanium Chlorides as Precursors", *Chemical Vapor Deposition*, 5(2) (Mar. 1999), pp. 69–73.

Martensson, et al., "Atomic Layer Epitaxy of Copper, Growth & Selectivity in the Cu (II)–2,2.6,6–Tetramethyl–3, 5–Heptanedion ATE/H2 Process", *J. Electrochem. Soc.*, 145(8) (Aug. 1998), pp. 2926–2931.

Min, et al., "Chemical Vapor Deposition of Ti–Si–N Films with Alternating Source Supply", *Mat., Res. Soc. Symp. Proc.*, vol. 564 (Apr. 5, 1999), pp. 207–210.

Bedair, "Atomic layer epitaxy deposition processes", *J. Vac. Sci. Techol.* 12(1) (Jan./Feb. 1994).

Yamaga, et al., "Atomic layer epitaxy of ZnS by a new gas supplying system in a low–pressure metalorganic vapor phase epitaxy", *J. of Crystal Growth* 117 (1992), pp. 152–155.

Elam, et al., "Nucleation and growth during tungsten atomic layer deposition on SiO2 surfaces," Thin Solid Films 386 (2001) pp. 41–52, (Accepted Dec. 14, 2000).

Ohba, et al., "Thermal Decomposition of Methylhydrazine and Deposition Properties of CVD TiN Thin Films", Conference Proceedings, Advanced Metallization for ULSI Applications in 1993 (1994), pp. 143–149.

Scheper, et al.,"Low–temperature deposition of titanium nitride films from dialkylhydrazine–based precursors", Materials Science in Semiconductor Processing 2 (1999), pp. 149–157.

Suzuki, et al., "A 0.2-$\mu$m contact filing by 450°C–hydrazine–reduced TiN film with low resistivity", IEDM 92–979, pp. 11.8.1–11.8.3.

Suzuki, et al., "LPCVD–TiN Using Hydrazine and TiCl$_4$", VMIC Conference (Jun. 8–9, 1993), pp. 418–423.

IBM Tech. Disc. Bull. Knowledge–Based Dynamic Scheduler in Distributed Computer Control, (Jun. 1990), pp. 80–84.

IBM Tech. Disc. Bull. "Multiprocessor and Multitasking Architecture for Tool Control of the Advanced via Inspection Tools" (May 1992), pp. 190–191.

McGeachin, S., "Synthesis and properties of some $\beta$–diketimines derived from acetylacetone, and their metal complexes", Canadian J. of Chemistry, vol. 46 (1968), pp. 1903–1912.

Solanki, et al., "Atomic Layer deposition of Copper Seed Layers", Electrochemical and Solid State Letters, 3(10) (2000), pp. 479–480.

Nerac.Com Retro Search: Atomic Layer Deposition of Copper, dated Oct. 11, 2001.

Nerac.Com Retro Search: Atomic Layer Deposition/Epitaxy Aluminum Oxide Plasma, dated Oct. 2, 2001.

NERAC Search abstract of "Atomic Layer deposition of Ta and Ti for Interconnect Diffusion Barriers", by Rossnagel, et al., J. Vac. Sci. & Tech., 18(4) (Jul. 2000).

Abstracts of articles re atomic layer deposition.

Abstracts of search results re atomic layer deposition, search dated Jan. 24, 2002.

Abstracts of articles re atomic layer deposition and atomic layer nucleation.

Abstracts of articles re atomic layer depostion and semiconductors and copper.

Abstracts of articles—atomic layer deposition.

NERAC Search—Atomic Layer Deposition, search dated Oct. 16, 2001.

Bader, et al., "Integrated Processing Equipment", Solid State Technology, Cowan Pub., vol. 33, No. 5 (May 1, 1990), pp. 149–154.

Choi, et al., "The effect of annealing on resistivity of low pressure chemical vapor depositied titanium diboride", J. Appl. Phys. 69(11) (Jun. 1, 1991), pp. 7853–7861.

Choi, et al., "Stability of TiB$_2$ as a Diffusion Barrier on Silicon", J. Electrochem. Soc. 138(10) (Oct. 1991), pp. 3062–3067.

"Cluster Tools for Fabrication of Advanced devices" Jap. J. of Applied Physics, Extended Abstracts, 22$^{nd}$ Conference Solid State Devices and Materials (1990), pp. 849–852 XP000178141 (Article on Order—to be Provided).

"Applications of Integrated processing", Solid State Technology, US, Cowan Pub., vol. 37, No. 12 (Dec. 1, 1994), pp. 45–47.

Kitigawa, et al., "Hydrogen–mediated low temperature epitaxy of Si in plasma–enhanced chemical vapor deposition", Applied Surface Science (2000), pp. 30–34 (Article on Order—to be Provided).

"Cluster Tools for Fabrication of Advanced Devices" Jap. J. of Applied Physics, Extended Abstracts, 22nd Conference Solid State Devices and Materials (1990), pp. 849–852 XP000178141.

Kitigawa, et al., "Hydrogen–mediated low temperature epitaxy of Si in plasma–enhanced chemical vapor deposition", Applied Surface Science (2000), pp. 30–34.

Lee, et al., "Pulsed nucleation for ultra–high aspect ratio tungsten plugfill", Novellus Systems, Inc. (2001), pp. 1–2.

* cited by examiner

VALVE CONTROL SYSTEM FOR ATOMIC LAYER DEPOSITION CHAMBER

FIELD OF THE INVENTION

This invention is concerned with semiconductor manufacturing processes, and is more particularly concerned with apparatus and methods for controlling deposition chambers.

BACKGROUND OF THE INVENTION

Semiconductor devices are made on substrates, such as silicon wafers or glass plates, for use in computers, monitors, and the like. These devices are made by a sequence of fabrication steps, such as thin film deposition, oxidation or nitration, etching, polishing, and thermal and lithographic processing.

Thin film deposition typically is performed in a low-pressure processing chamber. In chemical vapor deposition, a wafer or other substrate is loaded into a processing chamber and is exposed to a process gas under suitable conditions for deposition of the process gas or a component of the process gas in the form of a thin film on the wafer.

There are a number of different varieties of chemical vapor deposition processes, of which one of the more recently developed is referred to as atomic layer deposition (ALD) or atomic layer chemical vapor deposition (ALCVD). In atomic layer deposition, many thin film layers are deposited on the wafer in a repetitive process in which the wafer is alternately exposed to more than one process gas. Each cycle of an ALD process entails opening and closing a number of valves which control the flow to the processing chamber of process gases or a purge gas. Because each cycle is repeated numerous times, the amount of time required to generate, transmit and execute valve opening and closing commands may be a significant factor in the overall elapsed time required to complete an ALD process. The present inventors have recognized that a key to improving throughput for ALD processes lies in shortening the "refresh time" for valve control commands, where "refresh time" refers to the time required to generate, transmit and execute a command.

SUMMARY OF THE INVENTION

In accordance with the invention, there is provided a valve control system for a semiconductor processing chamber. The valve control system includes a system control computer and a plurality of electrically controlled valves associated with a processing chamber. The valve control system further includes a programmable logic controller in communication with the system control computer and operatively coupled to the electrically controlled valves. The programmable logic controller may control the electrically controlled valves with a refresh time of less than ten milliseconds, and preferably with a refresh time on the order of one millisecond (msec).

The valve control system may further include an interface board and a driver circuit coupling the programmable logic controller to the electrically controlled valves. The interface board may include solid state relays.

The programmable logic controller may include an output power supply adapted to provide an output signal from the programmable logic controller. The valve control system may further include an interlock circuit operatively coupled to the output power supply and adapted to disable the output power supply upon occurrence of an interlock condition.

The system control computer may be operatively coupled to the output power supply of the programmable logic controller and may be adapted to disable the output power supply in response to an operator input signal. The valve control system may include a control panel operatively connected to the system control computer and adapted to receive input from a human operator.

The plurality of electrically controlled valves of the valve control system may include a first valve, a second valve and a third valve. The first valve may be coupled to a source of a first process gas, the second valve may be coupled to a source of a second process gas, and the third valve may be coupled to a source of a purge gas.

According to another aspect of the invention, a method of operating a valve associated with a semiconductor processing chamber is provided. The method includes generating an operation command for the valve, transmitting the generated operation command to the valve, and executing the transmitted operation command at the valve. The generating, transmitting and executing steps may all be performed within a time period that does not exceed 10 msec.

According to still another aspect of the invention, a method of operating a valve associated with a semiconductor processing chamber is provided. The method includes providing an electrically-controlled valve and downloading a process recipe command from a system control computer to a programmable logic controller. The method further includes repeatedly generating open and close commands at the programmable logic controller in accordance with the downloaded process recipe command. Further included in the method are steps of transmitting the open and close commands from the programmable logic controller to the electrically-controlled valve, and repeatedly opening and closing the electrically-controlled valve in response to the transmitted open and close commands.

The method according to this aspect of the invention may further include flowing a process gas or a purge gas to the semiconductor processing chamber in response to the opening of the electrically-controlled valve.

With the valve control system arranged in accordance with the invention, commands to open or close valves for process gases or purge gas may be generated and executed with a refresh time on the order of one millisecond. With such a rapid refresh time, the many repetitive gas flow cycles required for ALD can be performed in an efficient manner, thereby increasing throughput.

Aspects of the invention also call for a hardware interlock operating through the output power supply of the programmable logic controller so that safety requirements are satisfied. Moreover, in accordance with an aspect of the invention, solid state relays are employed in interface circuitry which interconnects the PLC with the valves. The use of solid state relays allows the system to operate with a long life, notwithstanding the very numerous open-close cycles required for ALD processing.

Further features and advantages of the present invention will become more fully apparent from the following detailed description of a preferred embodiment, the appended claims and the accompanying drawings.

DESCRIPTION OF PREFERRED EMBODIMENT

Figure 1:
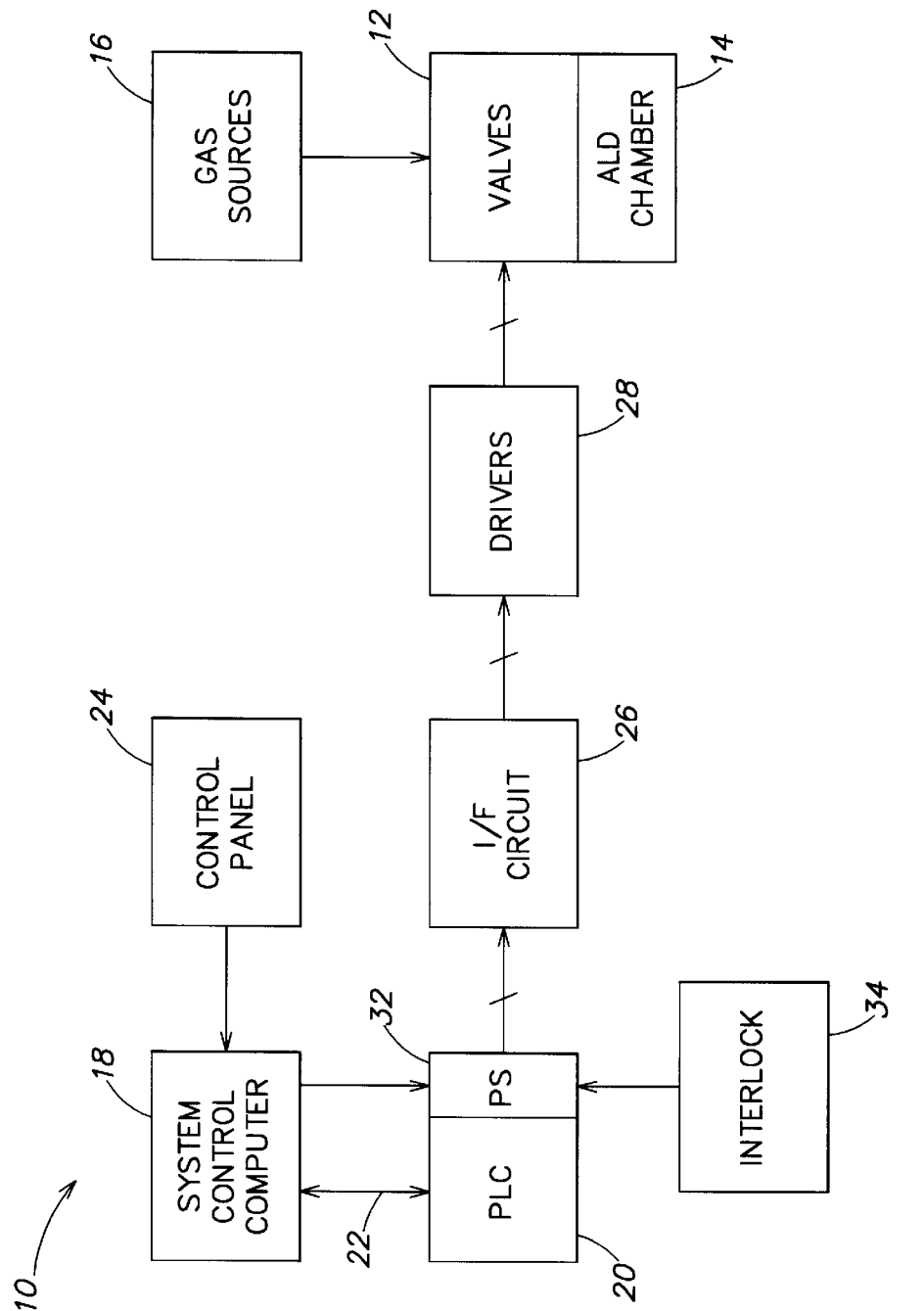
FIG. 1 is a schematic block diagram of a valve control system provided in accordance with an embodiment of the invention.

A valve control system provided in accordance with an embodiment of the invention will now be described with reference to FIG. 1, which is a schematic block diagram of the valve control system. In FIG. 1 reference numeral 10 generally refers to the valve control system. The valve control system 10 is for controlling a plurality of electrically-controlled valves 12 installed in association with a processing chamber 14. The processing chamber 14 may be a conventional chemical vapor deposition chamber, modified to optimize the throughput for ALD processing. The modifications to the processing chamber 14 may include installing the valves 12 directly on the lid of the processing chamber 14, and providing a process position for the substrate (not shown) that is very close to the gas distribution fixture (not shown) in the processing chamber 14. Both of these modifications are designed to minimize the gas exposure cycle time.

The valves 12, as noted before, are electronically-controlled valves, and are preferably type NC valves available from Fujikin of America Inc., Santa Clara, Calif. Each valve 12 is connected to a respective gas source 16. The gas sources 16 may include two or more process gas sources and a purge gas source.

The valve control system 10 includes a system control computer 18 and a programmable logic controller (PLC) 20 that is in data communication with the system control computer 18 via a communication channel 22. The system control computer 18 and the PLC 20 are programmed to operate in accordance with a master-slave arrangement such that the system control computer 18 delegates to the PLC 20 control of the valves 12. More particularly, the system control computer 18 may download to the PLC 20 data that defines a valve operation recipe, and the PLC 20 then controls the valves 12 to carry out the downloaded valve control recipe.

The system control computer 18 may be a conventional personal computer programmed to control operation of the processing chamber 14. Aside from the process and purge gas valve control functions delegated to the PLC 20, the system control computer 18 may control all other functions of the processing chamber 14, including control of, e.g., heaters, lifts, pumps, and valves such as exhaust valves that are different from the valves 12 controlled through the PLC 20. A conventional control panel 24, adapted to receive operator input, is connected to the system control computer 18.

Figure 2:
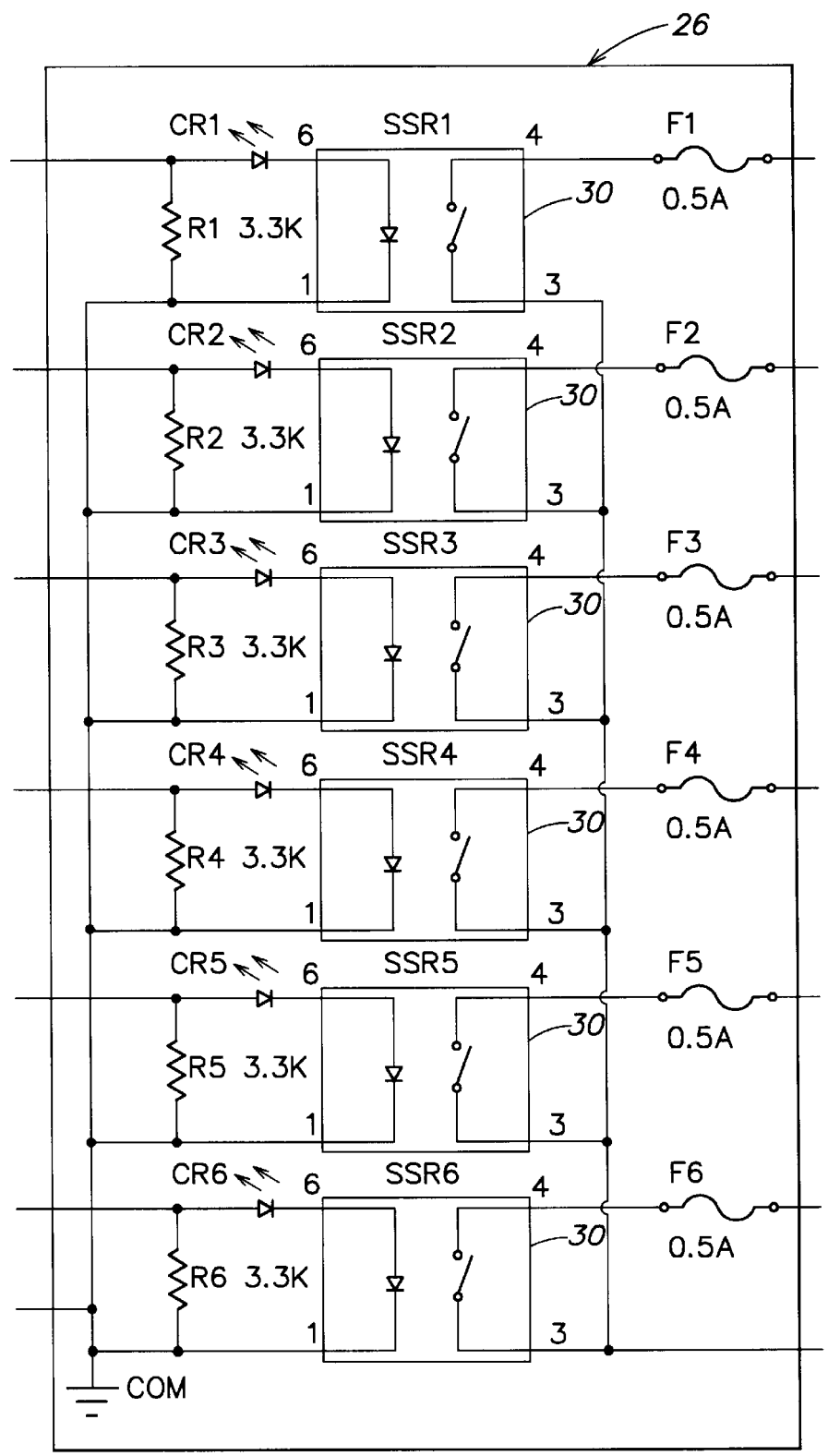
FIG. 2 is a schematic diagram of an interface board that is part of the system of FIG. 1.

The PLC 20 is connected to the valves 12 via an interface board 26 and drivers 28. The drivers 28 may be constituted by circuitry sold by Fujikin under model number 23-6C-DR. The layout of interface board 26 is schematically illustrated in FIG. 2. FIG. 2 is self-explanatory, but it will be noted that each signal channel of the board 26 includes a respective solid state relay 30. The interface board 26 serves to isolate the output of the PLC 20 from the drivers 28.

Continuing to refer to FIG. 1, PLC 20 may be constituted by a conventional device such as the Allen Bradley-MicroLogix model 1500. The PLC 20 includes an output power supply 32 which provides power for signals outputted by the PLC 20 via field effect transistors (FETs) which are not shown. An interlock circuit 34 is coupled to the power supply 32 of the PLC 20. In accordance with conventional practice, the interlock circuit 34 is adapted to receive sensor signals to indicate conditions for which immediate shutdown of the process operation is required. Such conditions may be referred to as "interlock conditions" such as opening of the gas cabinet door (not shown). In accordance with the invention, upon the interlock circuit 34 receiving a signal indicative of an interlock condition, the interlock circuit 34 disables the power supply 32 of PLC 20, thereby causing immediate closure of any open valve 12.

The system control computer 18 is also coupled to the power supply 32 of PLC 20 for the purpose of disabling the power supply 32 and thereby shutting any open valve 12 upon receipt of a shutdown signal received from a human operator via control panel 24.

The system control computer 18 may download commands to the PLC 20, including a recipe for valve operation during an ALD process, via the communications channel 22. Moreover, the PLC 20 may send data messages to the system control computer 18 via the communication channel 22. Such data messages may include acknowledgement messages and status messages that indicate, for example, a number of gas exposure cycles that have been performed from a recipe in process, or that indicate that a recipe has been completed.

In operation, the system control computer 18 controls components of the processing chamber 14 to carry out functions such as loading a wafer for processing in the chamber 14, positioning the wafer at an appropriate place in the chamber 14 for processing, and pumping out the chamber 14. At a time when the chamber 14 is ready to perform an atomic layer deposition process, the system control computer 18 downloads to the PLC 20 data that indicates the process recipe in terms of control of the valves 12. On the basis of the downloaded data, the PLC 20 outputs command signals to the valves 12 by way of interface board 26 and drivers 28, to selectively open and close the valves 12, and thereby to selectively expose the wafer in the processing chamber 14 to gases from gas sources 16.

Figure 3:
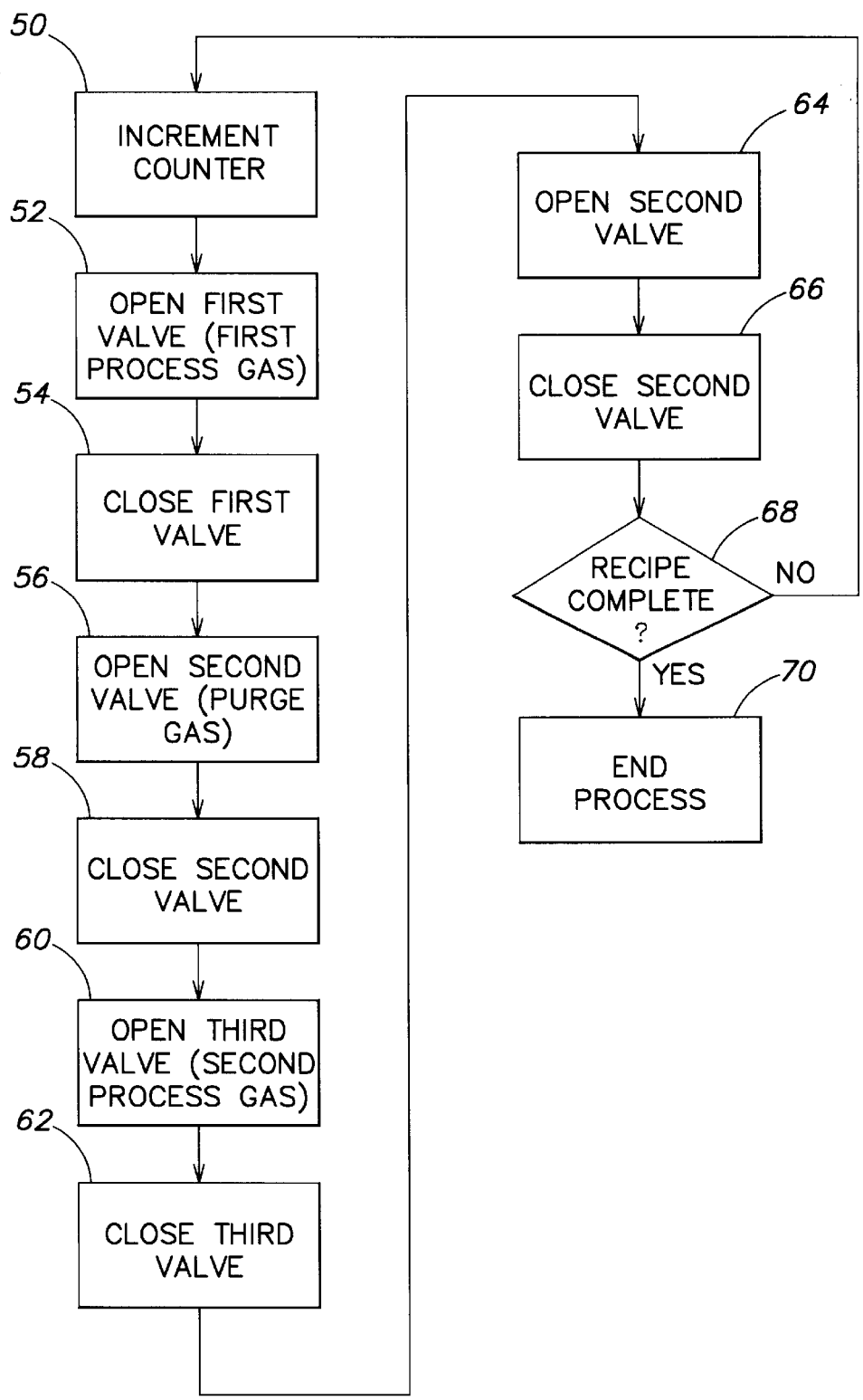
FIG. 3 is a flow chart that illustrates valve control operations for an ALD process.

FIG. 3 is a flow chart that illustrates a sequence of functions initiated by the PLC 20 in connection with an ALD process performed in the processing chamber 14.

Initially in the process of FIG. 3 is a step 50, at which the PLC 20 increments a counter, which may have been reset in an initialization procedure (not shown). Following step 50 is step 52, at which the PLC 20 generates and outputs a command to open a first one of the valves 12. It is assumed that the first one of the valves 12 is connected to a source of a first process gas, which may be, for example, silane ($SiH_4$) or diborane ($B_2H_2$). The first valve then opens in response to the command from the PLC 20 and the first process gas enters the first processing chamber 14 and impinges on the wafer to deposit a first thin film on the wafer. The first valve is maintained in an open condition for a predetermined period of time which may be, for example, tens of milliseconds. Then, with a predetermined timing according to the recipe, the PLC 20 generates and transmits a command to close the first valve (step 54). The first valve is closed in response to the closing command. Simultaneously, the PLC 20 issues a command to open a second valve (step 56) which may be connected to a source of purge gas such as argon. Purge gas then flows into the chamber 14. Purging continues for a predetermined period of time, which may be on the order of a few hundred milliseconds, and then, with a predetermined timing, the PLC 20 issues a command (step 58) to close the second valve, thereby ending the purging.

Following step 58 is step 60. At step 60 the PLC 20 generates and transmits a command to open a third one of the valves 12. It is assumed that the third valve is connected to a second source of process gas, which may be, for example, tungsten fluoride ($WF_6$). Upon the opening of the third valve, the second process gas enters the chamber 14 and impinges on the wafer to deposit a second thin film layer on the wafer. The third valve may be maintained in an open position for a predetermined period of time which may be tens of milliseconds. Then, at a predetermined timing, the PLC 20 issues a command to close the third valve (62) and simultaneously issues a command to open the second valve (step 64) to initiate another purge. The purging continues for a predetermined period of time, which may be the same as the purge of step 56, and the purge is then terminated upon the PLC 20 issuing a command (step 66) to close the second valve.

To summarize what has occurred in steps 52–66, a brief stage in which a thin film is deposited on the wafer using a first process gas is followed by a purge stage, and then followed by a second brief stage in which a thin film is deposited on the wafer using a second process gas, followed by a second purge. These four stages may be considered to make up one cycle, and entail four commands to open valves and four commands to close valves. In one aspect, the control system 10 is arranged, and the valves 12 are selected, so that the refresh time required to generate, transmit and execute a valve opening or closing command takes less than ten milliseconds. For example, generation and transmission of the command may take less than 1 millisecond and execution of the command by the valve may take about 3 milliseconds. Such would not have been the case if, in accordance with conventional practices, valve operation signals for each valve opening and closing had been generated by and transmitted from the system control computer 18. Conventional practices in this regard might require up to one second or more for generation and transmission of each valve control command. The fast refresh time provided by the present invention is also supported by the selection of the valves 12 and the drivers 28 of the types referred to above and by the use of solid state relays in interface board 26.

Following step 66 is a decision block 68 at which it is determined whether the recipe for the ALD process has been completed. If not (i.e., if further cycles are required), the procedure of FIG. 3 loops back from decision block 68 to step 50 so that the counter is incremented and the cycle of steps 52–66 is performed again. A typical recipe for an ALD process may call for as few as 10 to 20 cycles or as many as 200–300 cycles or more. Once the number of cycles called for by the recipe has been performed, a positive determination is made at step 68 and the ALD process is completed (step 70). This may involve, for example, removing the wafer from the processing chamber 14.

Because the refresh cycle for process and purge gas valve opening and closing commands is quite short with the arrangement of the present invention, the numerous valve operation cycles required for ALD can be performed rapidly, thereby enhancing throughput for the ALD process. Furthermore, the control system of the present invention may be arranged so that a hardware interlock is provided via the output power supply of the PLC 20; consequently safety regulations requiring hardware interlocks are complied with. Still further, the signal path from the PLC 20 to the valves 12 may be implemented with high-speed and long-life solid state relays, so that a short refresh time is achieved, and the control system is durable notwithstanding the very numerous repetitive operations required of the relays.

Moreover, the valves selected for the system of the present invention respond very rapidly to operational command signals so that the refresh time is minimized.

The valve control arrangement of the present invention also has the advantage of reducing the processing burden on the system control computer, since the large number of repetitive commands required for ALD processing are generated by the PLC 20 rather than the system control computer 18.

Although the cyclic operating mode described in connection with FIG. 3 is advantageous for ALD operations, it is also contemplated to operate the control system 10 in a non-cyclic operating mode, in which commands for directly opening or closing valves 12 may be generated by the system control computer 18 and transmitted one by one via the PLC 20, the interface board 26 and the drivers 28.

The foregoing description discloses only a preferred embodiment of the invention; modifications of the above disclosed apparatus which fall within the scope of the invention will be readily apparent to those of ordinary skill in the art. Accordingly, while the present invention has been disclosed in connection with a preferred embodiment thereof, it should be understood that other embodiments may fall within the spirit and scope of the invention, as defined by the following claims.

The invention claimed is:

1. A valve control system for a semiconductor processing chamber, comprising:
   a system control computer;
   a plurality of electrically controlled valves associated with a processing chamber; and
   a programmable logic controller in communication with the system control computer and operatively coupled to the electrically controlled valves, wherein the programmable logic controller controls the electrically controlled valves with a refresh time of less than 10 msec.

2. The valve control system of claim 1, further comprising an interface board and a driver circuit coupling the programmable logic controller to the electrically controlled valves.

3. The valve control system of claim 2, wherein the interface board includes solid state relays.

4. The valve control system of claim 1, wherein the programmable logic controller includes an output power supply adapted to provide an output signal from the programmable logic controller; and further comprising an interlock circuit operatively coupled to the output power supply and adapted to disable the output power supply upon occurrence of an interlock condition.

5. The valve control system of claim 4, wherein the system control computer is operatively coupled to the output power supply and is adapted to disable the output power supply in response to an operator input signal.

6. The valve control system of claim 5, further comprising a control panel operatively connected to the system control computer and adapted to receive input from a human operator.

7. The valve control system of claim 1, wherein the plurality of electrically controlled valves includes a first valve, a second valve and a third valve, and wherein:
   the first valve is coupled to a source of a first process gas;
   the second valve is coupled to a source of a second process gas; and
   the third valve is coupled to a source of a purge gas.

8. A valve control system for a semiconductor processing chamber, comprising:
   a system control computer;
   a plurality of electrically controlled valves associated with a processing chamber; and
   a programmable logic controller in communication with the system control computer and operatively coupled to the electrically controlled valves, wherein the programmable logic controller includes an output power supply adapted to provide an output signal from the programmable logic controller; and further comprising an interlock circuit operatively coupled to the output power supply and adapted to disable the output power supply upon occurrence of an interlock condition.

9. The valve control system of claim 8, wherein the system control computer is operatively coupled to the output power supply and is adapted to disable the output power supply in response to an operator input signal.

10. The valve control system of claim 9, further comprising a control panel operatively connected to the system control computer and adapted to receive input from a human operator.

11. The valve control system of claim 8, wherein the plurality of electrically controlled valves includes a first valve, a second valve and a third valve, and wherein:
    the first valve is coupled to a source of a first process gas;
    the second valve is coupled to a source of a second process gas; and
    the third valve is coupled to a source of a purge gas.

* * * * *